United States Patent
Travis

(10) Patent No.: US 7,572,399 B2
(45) Date of Patent: Aug. 11, 2009

(54) POLYVINYLBUTYRAL ROLLS HAVING THICK EDGES RELATIVE TO THE INTERIOR OF THE ROLL AND A PROCESS FOR PREPARING SAME

(75) Inventor: Jimmy K. Travis, Fayetteville, NC (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 746 days.

(21) Appl. No.: 11/040,148

(22) Filed: Jan. 21, 2005

(65) Prior Publication Data

US 2005/0163976 A1 Jul. 28, 2005

Related U.S. Application Data

(60) Provisional application No. 60/538,904, filed on Jan. 23, 2004.

(51) Int. Cl.
*B29C 47/14* (2006.01)
(52) U.S. Cl. ............ 264/177.1; 156/102; 156/104
(58) Field of Classification Search ........ 156/102, 156/104; 264/177.1
See application file for complete search history.

(56) References Cited

U.S. PATENT DOCUMENTS

| 2,387,718 | A | * | 10/1945 | Coleman | 425/466 |
| 3,860,383 | A | * | 1/1975 | Sirevicius | 425/461 |
| 3,950,480 | A | * | 4/1976 | Adams et al. | 264/284 |
| 4,276,351 | A | | 6/1981 | Phillips | |
| 4,287,107 | A | * | 9/1981 | Hermann et al. | 524/318 |
| 4,292,372 | A | | 9/1981 | Moynihan | |
| 4,693,677 | A | | 9/1987 | Shigemoto et al. | |
| 5,137,673 | A | * | 8/1992 | Bourcier et al. | 264/151 |
| 5,421,085 | A | | 6/1995 | Muscato et al. | |
| 5,536,347 | A | * | 7/1996 | Moran | 156/103 |
| 5,639,538 | A | | 6/1997 | Wong | |
| 5,886,075 | A | * | 3/1999 | Keane et al. | 524/308 |
| 6,451,435 | B1 | * | 9/2002 | Klafka et al. | 428/437 |
| 2004/0166288 | A1 | | 8/2004 | Travis et al. | |

FOREIGN PATENT DOCUMENTS

| EP | 1190834 A | 3/2002 |
| FR | 2290290 A | 6/1976 |
| GB | 1400265 | 7/1975 |
| GB | 1470844 A | 4/1977 |
| GB | 2058662 A | 4/1981 |
| WO | WO96/28504 | 9/1996 |

OTHER PUBLICATIONS

PCT International Search Report, International Application No. PCT/US2005/002413, dated Jan. 21, 2005.
PCT Written Opinion, International Application No. PCT/US2005/002413, dated May 25, 2005.

* cited by examiner

*Primary Examiner*—Christina Johnson
*Assistant Examiner*—Galen Hauth
(74) *Attorney, Agent, or Firm*—Kevin S. Dobson; Mark D. Kuller

(57) ABSTRACT

The present invention is an extruded sheet of polyvinylbutyral having thick edges relative to the interior region, whereby the sheet can be taken up on a roll and aged in such a manner that the roll attains a cylindrical shape due to loss of circumference of the roll edge during aging.

20 Claims, No Drawings

POLYVINYLBUTYRAL ROLLS HAVING THICK EDGES RELATIVE TO THE INTERIOR OF THE ROLL AND A PROCESS FOR PREPARING SAME

This application claims the benefit of U.S. Provisional Application No. 60/538,904, filed Jan. 23, 2004.

BACKGROUND OF THE INVENTION

In the manufacture of transparent glass laminates that include a layer of plastic sheet or film (interlayer), problems can arise from post-manufacturing process defects in the manufacturing process for producing interlayer. These problems can affect the visual properties of a glass laminate made using interlayer produced using these flawed processes. At the very least, resultant glass laminates can have the problem of inconsistency in the quality of laminates having similar, if not identical, process histories.

Visual defects can result from poor de-airing of a pre-press in the process for manufacturing glass laminates. One such visual defect is the "tiger skin" appearance that can result when a laminate pre-press is not effectively de-aired. The tiger skin effect can be created when the interlayer sheeting does not lay flat between glass panels during lamination.

SUMMARY OF THE INVENTION

In one aspect, the present invention is an extruded polymer sheet of interlayer material, wherein the interlayer has a greater thickness at the edges than it does in its interior region at the time that the sheet is extruded.

In another aspect, the present invention is a process for producing cylindrical-shaped polymer rolls comprising the steps: extruding a polymer sheet such that the extreme edges of the polymer sheet are thicker than the middle section of the polymer sheet; forming a roll from the extruded polymer by taking up the extruded sheet onto a take-up roll such that the edges of the roll initially have a larger circumference than the middle of the roll; allowing the polymer roll to remain on the windup roll for a time sufficient for the circumference of the polymer roll at the edges to be within 10% of the circumference of the middle of the polymer roll.

In another aspect, the present invention is an improved laminate comprising an interlayer produced according to the process of the present invention.

DETAILED DESCRIPTION OF THE INVENTION

Interlayers suitable for use in laminar structures comprising at least one ply of glass such as plasticized PVB sheeting and other thermoplastic interlayers are prepared by processes well known in the art. Preparation of plasticized PVB is disclosed in Phillips, U.S. Pat. No. 4,276,351 (Phillips), and by Hussey et al., WO 96/28504 (Hussey), for example. In Phillips, a compatible amount of tetraethylene glycol diethylhexanoate is used in admixture with PVB to plasticize the resin. In Hussey, an adhesion control agent is used in addition to a plasticizer to make a PVB sheet. A wide variety of adhesion control agents can be used with polyvinylbutyral sheeting. In the instant invention a PVB sheet plasticized with a compatible quantity of glycol ester selected from the group consisting of triethyleneglycol di-n-heptanoate and tetraethylene glycol di-n-heptanoate, or with a compatible quantity of branched or unbranched di-esters such as triethylene glycol di-2-ethylbutyrate and triethylene glycol di-2-ethylhexanoate, and contains as an adhesion control agent an alkali or alkaline earth metal carboxylate such as formate, acetate, and the like, or a combination thereof. A process for preparing such sheeting is disclosed in Moynihan, U.S. Pat. No. 4,292,372 (Moynihan).

The interlayer described in Moynihan can be suitable for use in automobile windshields and side windows and body glass, in windows and windshields for vehicles of transportation other than automobiles such as trains and buses, and in glazing elements for buildings and architectural structures.

Laminates suitable for use in most of these applications can be prepared by a process or processes that require a deairing step, that is, a step where air and trapped gasses are removed from the pre-laminate structure before or during the lamination. It is known that in order to effectively remove most of the air from between the surfaces in a PVB laminar structure, the surface of the PVB sheeting should be roughened so as to have adequate escape paths to exit the pre-laminate. This can be effected by mechanically embossing or by melt fracture during extrusion of the interlayer sheet followed by quenching so that the roughness is retained during handling. Retention of the surface roughness is essential in the practice of the present invention to facilitate effective removal of the entrapped air during laminate preparation. However, it has surprisingly been found that retention of surface roughness alone does not guarantee effective removal of air.

Post-manufacturing handling and storage procedures can contribute to problems in later lamination of interlayer materials. This can be particularly true in the case where the interlayer material is a polyvinylbutyral (PVB) polymer. It can be particularly troublesome if the PVB is not laid flat on the surface of the surface to which it is to be laminated, for example glass, during the lamination. This is due to the tendency to trap air in the laminate if the PVB is not flat. In the present invention, a surprising contributor to the occasional tendency of PVB to resist a flat lie against glass was identified as the tendency of a sheet of PVB to shorter length lanes at the edges as time passes. In other words, as an extruded PVB sheet ages in roll form, the roll can become small in circumference (i.e. diameter) at the periphery of the sheet than at in the interior region. PVB having a smaller circumference, relative to the interior of the sheet can hinder obtaining a flat lie in setting up the PVB for lamination, and thereby contribute to ineffective de-airing during lamination.

PVB sheeting that is designed to have a thicker periphery than interior region, such that a roll of PVB attains a more cylindrical shape as it ages, can be made using conventional extrusion equipment. Any known process for extruding a sheet wherein the edges are thicker than the interior of the sheet is suitable for use in the practice of the present invention. For example, the extrusion die can be set for higher caliper at the edges than at the center or other techniques can be used to gain thickness at the edges such as variable shrinkage, etc.

The thickness difference between the center of the sheeting and the edges will vary depending on sheeting nominal thickness, sheeting width, surface pattern architecture, and residual tensions in the sheeting. In addition, the profile of the thickness change from the center of the sheeting and the edge must be controlled to correct for loss in circumference across the roll as it ages. A good initial estimate of this loss in circumference can be easily determined by measuring the loss of circumference in an aged roll before thickness compensation.

EXAMPLES

The following Examples and Comparative Examples are intended to be illustrative of the present invention, and are not intended in any way to limit the scope of the present invention.

General Extrusion Procedure for PVB Sheeting 100 parts of dry PVB flake of nominally 23% by weight of unbutyralated vinyl alcohol groups are mixed continuously in a twin-screw extruder with 35-40 parts of tetraethylene glycol di-n-heptanoate or other plasticizers known to be useful with PVB, and which have been pre-mixed with one or more light stabilizers and an antioxidant. The melt is forced through a slot die and forms sheeting of 0.038 mm nominal thickness at the interior and 0.040 mm at the edges of the sheeting.

De-Airing Efficiency at Room Temperature

De-airing efficiency of an interlayer with a specified pattern is determined using an apparatus which allows the absolute pressure of the interstitial space in an assembly to be measured. The interlayer to be tested is assembled as a normal assembly, except that the top plate of glass has a hole drilled through its center. The glass, the interlayer, and all auxiliary equipment must be equilibrated to 22.5±2.5° C. for one hour before testing. If an interlayer has two distinctly different patterns on either side, the side with the surface pattern to be evaluated is placed in contact with the piece of glass with a hole. The base of a pressure (or vacuum) coupler is affixed and sealed around the hole in the glass (a vacuum coupler is a device which, when connected, enables air to move between an enclosure and the outside). A piece of fabric (about 30 mm wide) is wrapped around the edges of the assembly. The base of another vacuum coupler plate is placed on top of two layers of cotton fabric (50 mm×50 mm) in one of the corners. The assembly with the peripheral breather and two base plates of couplers are then placed inside a 0.1-mm thick nylon bag. The bag is then heat-sealed. Cross-marks are cut through the bag just above the base plates. Vacuum couplers are attached through the nylon bag and care is taken to ensure that there are no leaks, as shown in FIG. 1. The corner plate is attached to the vacuum source (nominally 84 kPa below atmospheric), while the center plate is attached to a vacuum gauge or a calibrated pressure transducer. The gauge reading (or transducer output) is recorded at given intervals after the vacuum is applied. The recorded data contain the absolute interstitial pressure at 10-second intervals for the first minute after vacuum is applied, at 15-second intervals thereafter for one-half minute, at 30-second intervals thereafter for another one-half minute, and at one-minute intervals thereafter up to 10 minutes after the application of vacuum. A surface that allows for efficient vacuum de-airing would cause the absolute interstitial pressure to drop rapidly within a few minutes. The interstitial pressure at 90 seconds after evacuation is indicative of how well the interlayer de-airs. If at 90 seconds after evacuation, the absolute interstitial pressure is above 53.3 kPa, de-airing is inadequate, and the interlayer is not suitable for vacuum de-airing.

De-Airing Efficiency at Elevated Ambient Temperature

Determination of de-airing efficiency at high (elevated) ambient temperature is the same as that at room temperature, except that the interlayer to be tested, the glass, couplers are all equilibrated to 30.5±2.5° C. prior to testing. If at 90 seconds after evacuation, the absolute interstitial pressure is above 53.3 kPa, de-airing is inadequate, and the interlayer is not suitable for vacuum de-airing when the ambient temperature is elevated, as in the summer.

Example 1

Polyvinyl butyral sheeting is extruded according to the general procedure described above. The sheeting is plasticized with tetraethylene glycol di-n-heptanoate. The sheeting is tested for de-airing efficiency at 22.5° C. and at 30.5° C., according to the procedures described above.

Example 2

Polyvinyl butyral sheeting is extruded according to the general procedure described above. The sheeting is plasticized with triethylene glycol di-2-ethyl hexanoate. The sheeting is tested for de-airing efficiency at 22.5° C. and at 30.5° C., according to the procedures described above.

The invention claimed is:

1. A process for producing cylindrical-shaped polyvinyl butyral interlayer rolls comprising the steps: (a) extruding a polyvinyl butyral interlayer sheet such that the extreme edges of the polyvinyl butyral interlayer sheet are thicker than the middle section of the polyvinyl butyral interlayer sheet; (b) forming a roll from the extruded polyvinyl butyral interlayer sheet by taking up the extruded polyvinyl butyral interlayer sheet onto a wind-up roll such that the edges of the roll initially have a larger circumference than the middle of the roll; (c) allowing the polyvinyl butyral interlayer roll to remain on the wind-up roll for a time sufficient for the circumference of the polyvinyl butyral interlayer roll at the edges to be within 10% of the circumference of the middle of the polyvinyl butyral interlayer roll.

2. The process of claim 1 further comprising roughening the surface of the polyvinyl butyral interlayer sheet prior to the forming the roll.

3. The process of claim 2 wherein the roughening comprises mechanically embossing the interlayer sheet followed by quenching.

4. The process of claim 3 further comprising forming a pre-laminate from the polyvinyl butyral interlayer and at least one ply of glass and laminating the pre-laminate to form a glass laminate, including a de-airing step comprising removing air and trapped gasses from the pre-laminate structure before or during the lamination, and wherein the polyvinyl butyral interlayer sheet is plasticized with a plasticizer selected from the group consisting of triethyleneglycol di-n-heptanoate, tetraethylene glycol di-n-heptanoate, triethylene glycol di-2-ethylbutyrate, and triethylene glycol di-2-ethylhexanoate.

5. The process of claim 3 further comprising forming a pre-laminate from the polyvinyl butyral interlayer and at least one ply of glass and laminating the pre-laminate to form a glass laminate, including a de-airing step comprising removing air and trapped gasses from the pre-laminate structure before or during the lamination, wherein the polyvinyl butyral interlayer sheet is plasticized with a plasticizer selected from the group consisting of triethyleneglycol di-n-heptanoate, tetraethylene glycol di-n-heptanoate, triethylene glycol di-2-ethylbutyrate, and triethylene glycol di-2-ethylhexanoate, and wherein the polyvinyl butyral interlayer sheet contains as an adhesion control agent, an alkali or alkaline earth metal carboxylate.

6. The process of claim 2 wherein the roughening comprises melt fracture during extrusion of the interlayer sheet followed by quenching.

7. The process of claim 6 further comprising forming a pre-laminate from the polyvinyl butyral interlayer and at least one ply of glass and laminating the pre-laminate to form a glass laminate, including a de-airing step comprising removing air and trapped gasses from the pre-laminate structure before or during the lamination, and wherein the polyvinyl butyral interlayer sheet is plasticized with a plasticizer selected from the group consisting of triethyleneglycol di-n-heptanoate, tetraethylene glycol di-n-heptanoate, triethylene glycol di-2-ethylbutyrate, and triethylene glycol di-2-ethylhexanoate.

8. The process of claim 6 further comprising forming a pre-laminate from the polyvinyl butyral interlayer and at least one ply of glass and laminating the pre-laminate to form a glass laminate, including a de-airing step comprising removing air and trapped gasses from the pre-laminate structure before or during the lamination, wherein the polyvinyl butyral interlayer sheet is plasticized with a plasticizer selected from the group consisting of triethyleneglycol di-n-heptanoate, tetraethylene glycol di-n-heptanoate, triethylene glycol di-2-ethylbutyrate, and triethylene glycol di-2-ethylhexanoate, and wherein the polyvinyl butyral interlayer sheet contains as an adhesion control agent, an alkali or alkaline earth metal carboxylate.

9. The process of claim 2 wherein the polyvinyl butyral interlayer sheet is plasticized with a plasticizer selected from the group consisting of triethyleneglycol di-n-heptanoate, tetraethylene glycol di-n-heptanoate, triethylene glycol di-2-ethylbutyrate, and triethylene glycol di-2-ethylhexanoate.

10. The process of claim 9 wherein the polyvinyl butyral interlayer sheet contains as an adhesion control agent, an alkali or alkaline earth metal carboxylate.

11. The process of claim 10 further comprising forming a pre-laminate from the polyvinyl butyral interlayer and at least one ply of glass and laminating the pre-laminate to form a glass laminate, including a de-airing step comprising removing air and trapped gasses from the pre-laminate structure before or during the lamination.

12. The process of claim 9 further comprising forming a pre-laminate from the polyvinyl butyral interlayer and at least one ply of glass and laminating the pre-aminate to form a glass laminate, including a de-airing step comprising removing air and trapped gasses from the pre-laminate structure before or during the lamination.

13. The process of claim 2 wherein the polyvinyl butyral interlayer sheet is plasticized with triethylene glycol di-2-ethyl hexanoate.

14. The process of claim 2 wherein the polyvinyl butyral interlayer sheet contains as an adhesion control agent, an alkali or alkaline earth metal carboxylate.

15. The process of claim 2 further comprising forming a pre-laminate from the polyvinyl butyral interlayer and at least one ply of glass and laminating the pre-laminate to form a glass laminate, including a de-airing step comprising removing air and trapped gasses from the pre-laminate structure before or during the lamination.

16. The process of claim 1 wherein the polyvinyl butyral interlayer sheet is plasticized with a plasticizer selected from the group consisting of triethyleneglycol di-n-heptanoate, tetraethylene glycol di-n-heptanoate, triethylene glycol di-2-ethylbutyrate, and triethylene glycol di-2-ethylhexanoate.

17. The process of claim 1 wherein the polyvinyl butyral interlayer sheet is plasticized with triethylene glycol di-2-ethyl hexanoate.

18. The process of claim 1 wherein the polyvinyl butyral interlayer sheet contains as an adhesion control agent, an alkali or alkaline earth metal carboxylate.

19. The process of claim 1 further comprising forming a glass laminate from the polyvinyl butyral interlayer and at least one ply of glass.

20. The process of claim 1 further comprising forming a pre-laminate from the polyvinyl butyral interlayer and at least one ply of glass and laminating the pre-laminate to form a glass laminate, including a de-airing step comprising removing air and trapped gasses from the pre-laminate structure before or during the lamination.

* * * * *

UNITED STATES PATENT AND TRADEMARK OFFICE
CERTIFICATE OF CORRECTION

| | | |
|---|---|---|
| PATENT NO. | : 7,572,399 B2 | Page 1 of 1 |
| APPLICATION NO. | : 11/040148 | |
| DATED | : August 11, 2009 | |
| INVENTOR(S) | : Jimmy K. Travis | |

It is certified that error appears in the above-identified patent and that said Letters Patent is hereby corrected as shown below:

Column 6, Line 3, Claim 12 – add an "l" to pre-aminate, so that it reads -- pre-laminate --.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,572,399 B2  Page 1 of 1
APPLICATION NO. : 11/040148
DATED : August 11, 2009
INVENTOR(S) : Jimmy K. Travis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this

Seventh Day of September, 2010

David J. Kappos
*Director of the United States Patent and Trademark Office*